Patented Mar. 7, 1933

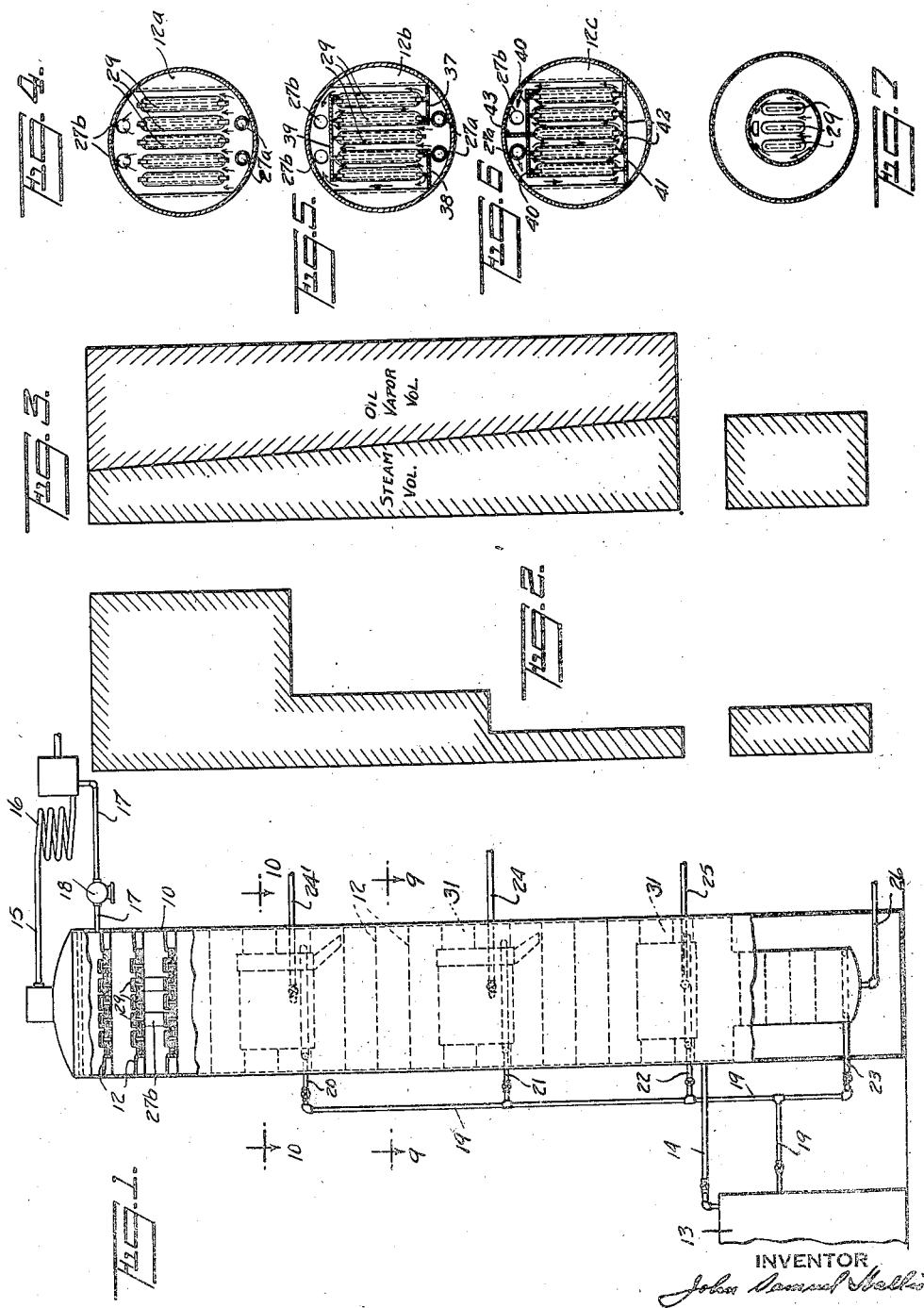

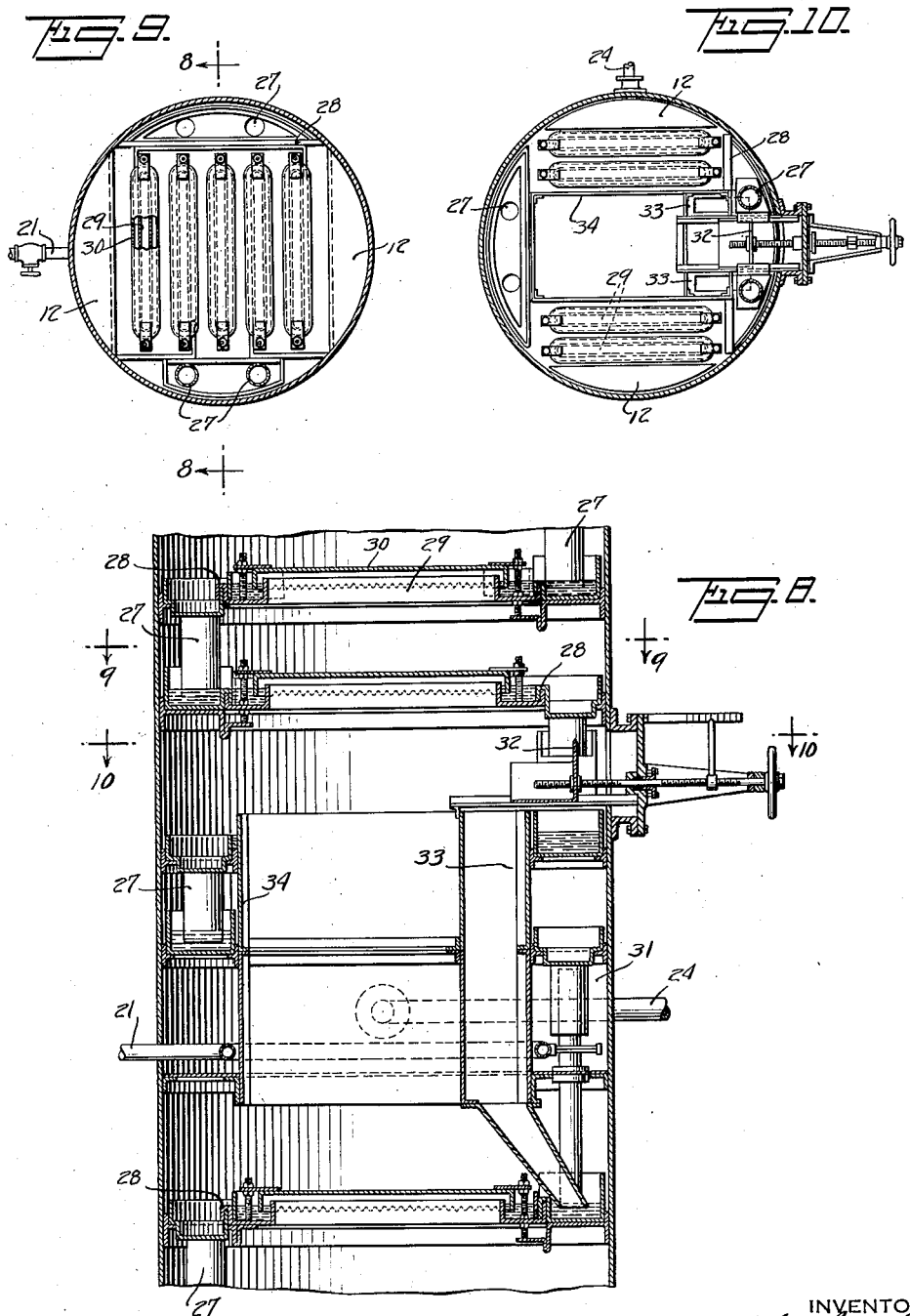

1,900,085

UNITED STATES PATENT OFFICE

JOHN SAMUEL WALLIS, OF NEW YORK, N. Y., ASSIGNOR TO FOSTER WHEELER CORPORATION, OF NEW YORK, N. Y., A CORPORATION OF NEW YORK

OIL FRACTIONATION

Application filed January 14, 1930. Serial No. 420,680.

My invention relates to oil fractionation. More particularly, my invention relates to apparatus for fractionating oil. Still more particularly, my invention relates to fractionating towers in which condensation is produced by reflux circulation and from which a plurality of side streams are withdrawn.

In fractionating towers of the type wherein condensation is obtained by reflux and from which a plurality of side streams are withdrawn, it is common practice to provide bubble trays of similar construction. The trays are made to have the same size vapor openings and to have the same velocity of flow of liquid horizontally over them at all places in the tower. In towers of this type the amount of liquid flowing down in different portions of the tower is not uniform. Consequently, the use of similar trays throughout a tower results in variation of velocity of flow of liquid over the trays.

It is the principal object of the present invention to provide structure whereby uniform or more or less equalized velocity of flow of liquid oil over bubble trays is obtained in a tower wherein the quantity of downflowing liquid is different for different zones or sections of the tower. In particular, I aim to improve towers of the type above referred to, although the invention is applicable to various kinds of structures.

Assume that stock oil is heated in a still and introduced into a fractionating tower, the conditions being such that 90 percent of the oil is in the vapor phase at the point of introduction of the oil into the tower. Assume also that 30 percent of this vapor is withdrawn as vapor at the top of the tower, the remainder being withdrawn as condensate at one or more intermediate points. It will be seen that the condensing effect of the tower must take care of the 60 percent which is liquefied in the tower. Since the condensation results (disregarding radiation) from the introduction into the tower of liquid oil, it will be seen that the quantity of liquid oil introduced for condensing purposes must be large to take care of the latent heat of vaporization of the oil which is liquefied in the tower. The result is that a large quantity of liquid flows over the upper trays of the tower and the quantity of liquid flowing over trays diminishes to a high degree at respectively lower points of the tower due to the condensation and the removal of fractions at the intermediate points of withdrawal. The reflux liquid being of low boiling point vaporizes in the upper part of the tower and there is thus a relatively large factor of recirculation in the upper part of the tower. The liquid flowing on the trays at the upper part of the tower may have a velocity many times greater than the liquid flowing on the trays adjacent the point of supply of oil to the tower from the still.

The slow flow of liquid oil on the trays in the higher temperature parts of the tower is undesirable since both slow flow of liquid and high temperature tend to increase precipitation. It will be seen that if there is any free carbon in the oil it is most likely to separate out from the liquid and cake on a tray at the point of highest temperature and slowest flow. It will thus be seen that these two factors, so to speak, aggravate each other. To overcome this disadvantage, I propose to construct the bubble trays so that the velocity of flow of liquid is made more uniform than has been prior practice. At the same time, I construct the trays so that the area for passage of vapor is not changed. Since the volume of vapor (oil plus steam) may be considered uniform throughout the tower for the present consideration, it will be seen that this volume will determine the size of trays for the best efficiency. Using a cylindrical tower, which is best suited for practical purposes, the area of trays for liquid flow is consequently the same for different trays if the whole surface or a given percentage of surface of the tray is used for liquid flow. Consequently, I attain my object by maintaining constant area of gas and liquid contact on the trays and increase the length of the path of travel for oil as the amount of liquid for a given tray decreases per unit of time.

The invention will be explained with reference to the accompanying drawings showing more or less diagrammatically one form of apparatus embodying the invention, and consideration of the following specification will show more clearly the nature, objects and advantages of the invention.

In the drawings:

Fig. 1 shows more or less diagrammatically an oil fractionating tower;

Fig. 2 is a diagram of quantities of liquid in different parts of the tower;

Fig. 3 is a diagram showing proportion of steam volume to oil volume;

Fig. 4 is a more or less diagrammatic cross-sectional view of the trays in the upper part of the tower shown in Fig. 1;

Fig. 5 is a similar cross-sectional view showing the trays in the intermediate portion of the tower;

Fig. 6 is a cross-sectional view of a portion of the tower just above the oil supply;

Fig. 7 is a cross-sectional view of the lower part of the tower;

Figs. 4 to 7 inclusive are shown opposite portions of the tower containing the trays therein represented respectively;

Fig. 8 is a more detailed view of a portion of the tower;

Fig. 9 is a cross-sectional view taken on the line 9—9 of Fig. 8 and on the line 9—9 of Fig. 1; and Fig. 10 is a cross-sectional view taken on the line 10—10 of Fig. 8 and on the line 10—10 of Fig. 1.

The tower comprises a shell 10 which is vertically disposed and cylindrical and preferably of uniform diameter except for the base portion thereof. The tower contains a series of horizontal bubble trays indicated generally at 12, which trays may be of various kinds, trays with elongated ports being shown for sake of illustration.

Oil to be fractionated in the tower 10 is supplied from a still or heater 13 by means of a conduit 14. Vapor is withdrawn from the upper part of the tower through conduit 15, is condensed in a condenser 16 and a portion of this oil is pumped back through conduit 17 and pump 18 into the top of the tower above the upper tray, constituting the reflux which serves as a condensing medium within the tower. Steam is supplied from the heater 13 through conduit 19 and the branch conduits 20, 21, 22 and 23 to various vertically disposed portions of the tower as shown in Fig. 1. Intermediate fractions are withdrawn from the tower through conduits 24', 24 and 25 and the bottoms are withdrawn through conduit 26.

The reflux oil flows downwardly from tray to tray. Downflow connections are provided as shown in Fig. 8 and indicated generally by reference character 27. Each tray carries a body of liquid thereon, the height of which is determined by the height of an overflow edge 28 or other similar level maintaining device. The elongated ports 29 have raised sides to prevent liquid from flowing down through the same and have caps 30 thereover having down-turned edges which extend into the body of liquid oil on the tray. Vapors passing upwardly through the tower are forced to pass through the ports 29 and through liquid on the trays.

At various places in the tower there are scrubbing pockets such as shown at 31 in Fig. 8. The downward flow of liquid is divided above each scrubbing pocket by an adjustable wier member 32, the oil at this point being in part caused to pass into the scrubbing pocket and in part by-passed through by-pass connection 33 to a tray below the scrubbing section. An internal conduit 34 serves for upward flow of oil vapor past the scrubbing section. The steam is introduced into the scrubbing section as through conduit 21 and the fraction is withdrawn therefrom as through the conduit 24. I do not claim as my invention these details of bubble tray construction or the structure of the scrubbing section. For further information as to these features reference may be had to a copending application of John Primrose and Harry R. Swanson, Serial No. 106,866, filed May 5th, 1926, which has matured into Patent No. 1,893,906, granted January 10, 1933.

Fig. 2 is a diagram showing roughly the amount of liquid in the tower at different portions of the tower, under an assumed state of conditions substantially of 36% overhead vapor and three side streams of 36%, 12% and 6% respectively. The diagram is merely by way of example, but is typical of the general relation of quantities of liquid in a tower of this kind. The reflux liquid passing through conduit 17 is a big percentage of the total liquid in the tower. Consequently there is a large amount of liquid flowing over the trays in the upper part of the tower. Much of this liquid reevaporates in the upper part of the tower and as a result of operation including the withdrawal of a fraction through conduit 24', the quantity of liquid is so reduced that the quantity flowing over the trays between the withdrawal conduits 24' and 24 may be one-third the quantity in the upper part of the tower. Similarly the amount of liquid flowing over the trays below withdrawal conduit 24 and above the oil inlet 14 is much reduced. There is condensation at all points of the tower and so there may be a difference of quantities on all trays, but in general the change of quantity at the place of withdrawal may be as shown in Fig. 2.

If the same kind of bubble tray is used in all parts of the tower, with the same number of ports and the same size of ports, the flow across the trays is of much higher velocity at the top plate, and, in accordance with the assumed conditions, the velocity of liquid across the tray near the vapor inlet 14 may be one-sixth or less of the velocity on the uppermost tray. The lowest tray of those now referred to is in the highest temperature zone and the velocity of liquid thereon should be high to eliminate the possibility of deposition or precipitation.

In order to equalize, so far as possible, the rate of flow of liquid over the trays, I propose to use trays of uniform gas passage area but constructed differently for different parts of the tower so as to vary the cross-sectional area of the path of liquid flow in order to substantially prevent reduction of liquid flow velocity due to the lesser quantities of liquid in lower portions of the tower, respectively. My plan for accomplishing this object is shown more or less diagrammatically in Figs. 4, 5 and 6.

Referring to Fig. 3, it is to be noted that the vapor volume throughout the fractionating tower above the inlet is practically uniform. This volume is probably ten to fifteen per cent less at the base of the tower than at the top of the tower, and tends to become more nearly constant if steam is used in the distillation. Steam will enter the base of the tower at, for example, 750 degrees Fahrenheit with a relatively large volume and leave at, for example, 300 degrees with a relatively low volume. The oil vapor enters at 750 degrees with relatively low volume, while at the top of the tower lighter fractions in combination with the light reflux will have a relatively large volume. Combining both the steam and oil vapors, it may be assumed that the volume at the base of the tower is slightly less than at the top of the tower. While this volume may be ten per cent less at the base of the tower, the quantity of reflux flowing across the lowest tray has been reduced approximately eighty-five per cent as compared with the reflux flowing over the top tray. The port area cannot be reduced at the lowest part of the tower in proportion to the decreased liquid flow since there would be insufficient port area to handle the vapor volume. Consequently, I maintain uniformity or substantial uniformity of port area and vary the cross-sectional area of flow.

Referring to Fig. 4, the tray 12a shown has a number of parallel elongated ports. The oil flows onto the tray from connections 27a, flows in a uni-directional path across the tray and down to the next tray through connections 27b.

Referring to Fig. 5, the tray 12b is equipped with flow directing members 37, 38 and 39. As can be seen from the drawings, the oil flowing down onto the tray through the connections 27a is constrained by the directing or baffle members 37 and 38 to flow to each side of the central port 29, but cannot immediately flow along the outer ports. The oil after flowing to each side of the central port is caused by the baffle member 39 to reverse its flow and flow backwardly inside the outermost ports and then the oil again changes its direction due to the members 37 and 38 and finally flows out through connections 27b. By this means, the path of flow has been lengthened and the cross-sectional area of flow has been diminished. The length of travel is approximately tripled and the velocity is consequently made more nearly equal to the velocity on the top trays 12a since the volume of liquid has been reduced to approximately one-third as shown by the diagram, Fig. 2.

Referring to Fig. 6, the oil enters the tray 12c from connection 27a and passes serially between all the ports due to the baffling members 40, 41, 42 and 43. Thus the length of the path of travel has been doubled compared with the flow over the trays 12b, and the velocity has been maintained at an appreciable value since the reduction in liquid volume is substantially in accordance with the change in flow area.

Thus it will be seen that I have increased the length of the path of flow of liquid on the lower trays relative to the length of path of flow on the upper trays, and diminished the cross-sectional areas, in order to equalize the rate of liquid flow on the trays and to compensate for difference of quantity of liquid in different parts of the tower. I have also provided means for preventing precipitation on trays in a relatively high temperature zone.

It may be pointed out that my invention affords an advantage as respects adjustment of parts within the tower. With a tower having the same kind of trays at all points in the tower, so that the velocity of flow is different at different points of the tower and so that the quantiy is different at different points of the tower, the height of liquid on the trays differs as the quantity differs. As above stated, the level on a tray is determined by an overflow edge or like device. The liquid has a height on the tray above the overflow edge which has a relation to quantity and velocity. In the type of tower referred to with equal trays throughout the tower, the liquid will have a higher surface level above the overflow edge in the upper part of the tower than in the lower part of the tower. Consequently, it is common practice to adjust the caps (see cap 30, Fig. 8) over the ports to a lower height on the trays in the lower part of the tower so that the caps will have a more or less uniform submergence in the liquid body. By means of the present invention, the velocity is equalized, that is, made uniform to a more or less extent and, preferably, to as near uniform as possible, as a result of which the level of the surface of liquid at the overflow edges of the trays will be more uniform. Consequently, my invention permits of having the bubble caps adjusted to the same structural height above the base of each tray for providing the same degree of bubble cap submergence on the various trays. This will obviate or lessen the necessity of compensating adjustments.

Thus, it will be seen that my invention provides means whereby a uniform height of bubble caps with respect to respective trays provides a uniform degree of submergence of the caps independently of quantities of liquid flowing over the various trays.

It will be obvious that the invention is not confined to any specific arrangements of flow-directing members and that it is a simple matter for any given installation to devise a set of baffles or other flow-directing means which will alter the path of flow to make the flow as near uniform or to otherwise equalize the rate of flow to any extent desired with respect to the particular installation.

What I claim is:

1. A fractionating tower comprising a shell, means to supply oil vapor to the shell, means for producing downward flow of condensate in the shell, a plurality of bubble trays in the shell for flow of liquid thereover and for contact of the liquid with vapor, means for withdrawing fraction products at different levels and means on the trays for equalizing the rate of liquid flow on the trays.

2. A fractionating tower comprising a shell, means to supply oil vapor to the shell, means for producing downward flow of condensate in the shell, a plurality of bubble trays in the shell for flow of liquid thereover and for contact of the liquid with vapor, means for withdrawing fraction products at different levels and means on the trays for directing flow of liquid thereon to compensate for differences of quantity of liquid in different parts of the tower.

3. A fractionating tower comprising a shell, means to supply oil vapor to the shell, means for producing downward flow of condensate in the shell, a plurality of bubble trays in the shell for flow of liquid thereover and for contact of the liquid with vapor, means for withdrawing fraction products at different levels and means for decreasing the width of the path of flow of liquid on lower trays below the width of the path of flow on upper trays.

4. A fractionating tower comprising a shell, means to supply oil vapor to the shell, means for producing downward flow of condensate in the shell, a plurality of bubble trays in the shell for flow of liquid thereover and for contact of the liquid with vapor, means for withdrawing fraction products at different levels, means for providing a given channel of flow on bubble trays in a relatively low temperature zone and means for providing a longer and narrower channel of flow on bubble trays in the relatively high temperature zone for preventing precipitation on the latter.

5. A fractionating tower comprising a shell, means to supply oil vapor to said shell, means for producing downward flow of condensate in the shell, means for withdrawing a fraction product from the shell, an upper set of trays above the point of fraction withdrawal, a lower set of trays below the point of fraction withdrawal, the trays comprising means for contact of vapor with liquid flowing thereover and means for producing a longer path of flow of liquid over the trays of the lower set than the trays of the upper set.

6. A fractionating tower comprising a shell, means to supply oil vapor to said shell, means for producing downward flow of condensate in the shell, means for withdrawing a fraction product from the shell, an upper set of trays above the point of fraction withdrawal, a lower set of trays below the point of fraction withdrawal, the trays comprising means for contact of vapor with liquid flowing thereover, means for producing flow of liquid in one direction over the trays of the upper set and means for producing flow of liquid in several directions over the trays of the lower set.

7. In a fractionating tower wherein condensate cascades downwardly over gas and liquid contact members and in contact with upwardly flowing vapors and wherein there is intermediate fraction withdrawal, that improvement which consists in altering the dimensions of the path of liquid flow after fraction withdrawal to substantially prevent reduction of liquid flow velocity due to the withdrawal.

8. In a fractionating tower wherein condensate cascades downwardly over gas and liquid contact members and in contact with upwardly flowing vapors and wherein there is intermediate fraction withdrawal, that improvement which consists in altering the dimensions of the path of liquid flow after fraction withdrawal to substantially prevent reduction of liquid flow velocity due to the withdrawal, while maintaining substantially constant cross-sectional area of gas passage through the gas and liquid contact members.

9. A fractionating tower comprising a shell, means to supply oil vapor to said shell, means for producing downward flow of condensate in the shell, means for withdrawing a fraction product from the shell, an upper set of trays above the point of fraction withdrawal, a lower set of trays below the point of fraction withdrawal, the trays having ports for passage of vapor therethrough of equal area for the upper and lower sets of trays and members adjacent said ports for causing contact of vapor with liquid flowing thereover, and means for altering the width of the path of flow of liquid over the trays of the lower set relative to the upper set to provide a lesser effective cross-sectional area of path of flow on the trays of the lower set than on the trays of the upper set.

10. A fractionating tower comprising a shell, means to supply oil vapor to the shell, means for producing downward flow of condensate in the shell, a plurality of bubble trays in the shell for flow of liquid thereover and for contact of the liquid with vapor, means for withdrawing fraction products at different levels and upstanding baffling members on lower trays for decreasing the cross-sectional area of flow thereover below the cross-sectional area of flow on upper trays.

11. In a fractionating tower wherein condensate cascades downwardly over gas and liquid contact members and in contact with upwardly flowing vapors and wherein there is intermediate fraction withdrawal, that improvement which consists in providing a given path of liquid flow before fraction withdrawal and providing a longer and narrower path of liquid flow after fraction withdrawal to substantially prevent reduction of liquid flow velocity due to withdrawal.

12. A fractionating tower comprising a shell, means to supply oil vapor to the shell, means for producing downward flow of condensate in the shell, a plurality of bubble trays in the shell for flow of liquid thereover and for contact of liquid with vapor comprising ports having upstanding edges and bubble caps arranged over the ports, means for adjusting the heights of the bubble caps with respect to the trays, means for withdrawing fraction products at different levels of the shell and means for decreasing the width and increasing the length of the path of flow of the liquid on each group of trays below each level above the vapor inlet of the tower at which fraction products are withdrawn whereby substantially the same height adjustment of bubble caps on the trays gives substantially uniform submergence of the caps on the trays irrespective of the quantity of liquid flowing over the trays.

13. The method of fractionally distilling hydrocarbon oils which comprises heating the oil to vaporization temperature, introducing the heated oil into a fractionating tower having a plurality of bubble trays above the oil inlet, passing vapors of the oil counter-current to and in contact with reflux oil, withdrawing reflux oil at a plurality of levels in the tower and increasing the velocity of flow of reflux on the trays below each point of reflux withdrawal to provide a substantially uniform velocity of flow of reflux oil on said trays throughout the tower.

14. The method of fractionally distilling hydrocarbon oils which comprises heating the oil to vaporization temperature, introducing the heated oil into a fractionating tower having a plurality of bubble trays above the oil inlet, passing vapors of the oil counter-current to and in contact with reflux oil, withdrawing reflux oil at a plurality of levels in the tower and increasing the velocity of flow of reflux on the trays below each point of reflux withdrawal by increasing the length and decreasing the width of the path of flow of the reflux on the trays to provide substantially uniform velocity of flow of reflux oil on said trays throughout the tower.

15. A fractionating tower comprising a shell, means for supplying oil vapor to the shell, a plurality of bubble trays in the shell above the inlet, means for producing a downward flow of condensate in the shell over the trays, vapor openings in the trays, walls surrounding the openings defining paths for the flow of reflux over the trays, means for withdrawing reflux at different levels from the shell, means on the trays associated with the paths for the flow of reflux arranged so that the velocity of flow of the oil vapors through the trays and the velocity of flow of the reflux on the trays are substantially respectively constant throughout the tower above the said inlet.

16. The method of fractionally distilling hydrocarbon oils which comprises heating the oil to vaporization temperature, introducing the heated oil into a fractionating tower having a plurality of bubble trays above the oil inlet, passing vapors of the oil counter-current to and in contact with reflux oil, withdrawing reflux oil at a plurality of levels in the tower, maintaining the velocity of flow of the oil vapors through said trays substantially constant and increasing the velocity of flow of reflux on the trays below each point of reflux withdrawal to provide a substantially uniform velocity of flow of reflux oil on said trays throughout the tower.

In testimony whereof I hereunto affix my signature.

JOHN SAMUEL WALLIS.